United States Patent [19]

Imhof

[11] 4,355,064
[45] Oct. 19, 1982

[54] COVERING MATERIAL

[76] Inventor: Jörg Imhof, 9601 Arnoldstein Nr. 202, (Kärnten), Austria

[21] Appl. No.: 112,018

[22] Filed: Jan. 14, 1980

[30] Foreign Application Priority Data

Jan. 19, 1979 [AT] Austria ................................. 400/79

[51] Int. Cl.³ .......................... B32B 1/08; F24J 3/02
[52] U.S. Cl. ................................. 428/178; 126/426; 126/448; 428/188
[58] Field of Search ................ 126/448, DIG. 2, 415, 126/442, 444, 426; 145/49, 53; 428/188, 179, 36, 178, 913

[56] References Cited

U.S. PATENT DOCUMENTS

| | | | |
|---|---|---|---|
| 2,986,014 | 5/1961 | Schilling | 62/80 |
| 3,022,781 | 2/1962 | Andrassy | 126/271 |
| 4,059,095 | 11/1977 | Grundmann et al. | 126/271 |
| 4,079,726 | 3/1978 | Voelker | 126/415 |
| 4,206,748 | 6/1980 | Goodman et al. | 126/444 |
| 4,244,353 | 1/1981 | Straza | 126/448 |
| 4,244,354 | 1/1981 | Williams | 126/448 |
| 4,258,703 | 3/1981 | Reitmaier | 126/442 |

FOREIGN PATENT DOCUMENTS 273440 11/1968 Fed. Rep. of Germany .
2747850 5/1979 Fed. Rep. of Germany .
597572 4/1978 Switzerland .

OTHER PUBLICATIONS

*IBM Technical Disclosure Bulletin*, vol. 22, No. 4, Sep. 1979, "Variable Thermal Resistance Insulator".

Primary Examiner—Paul J. Thibodeau
Attorney, Agent, or Firm—Martin A. Farber

[57] ABSTRACT

Covering material for walls, facades, roofs or the like, which is flown through by a heat transfer medium for the assimilation or absorption of radiant heat and/or heat from the environment and by which the shape and/or size of the cross-section of the flow channels for the heat transfer medium is variable by change of the pressure in the flow channels, for example, by change of the pressure in the heat transfer medium for knocking off the ice and/or snow edges as well as for the change of the free cross-section for the heat transfer medium. Further, a distributor or collector channel molding is provided with which the covering material can be connected into the circuit for the heat transfer medium.

7 Claims, 10 Drawing Figures

COVERING MATERIAL

FIELD OF THE INVENTION

The invention concerns a covering material for walls, facades or roofs, producing channels through which flow, preferably in the same direction, a liquid or gaseous heat transfer medium running parallel to one another for the assimilation or absorption and for the transport of radiant and/or environmental heat.

BACKGROUND OF THE INVENTION

Conventional roofings or facade coverings cannot be used for obtaining heat. On the other hand, the solar collectors known thus far are out of the question because of their expensive construction for an entire roof surface covering or for the facade covering and their use is often rejected for aesthetic reasons. Flexible solar collectors have also already been proposed. Thus, U.S. Pat. No. 4,059,095 describes a mat which can be rolled up and which is traversed by a serpentine channel. This mat is intended for preheating of water for swimming pools. Use of this mat as a covering material is not contemplated.

The task of this invention is to make a covering material of the type mentioned at the beginning which allows one to call upon a building covering, for example the building coping, for obtaining heat through absorption of the irradiated solar energy and for obtaining heat from the environment in addition to its function as protection against atmospheric influences.

SUMMARY OF THE INVENTION

This task is solved with the invention in that the covering material is made as an endlessly finished, flexible track of synthetic material, as for example plastomer or elastomer materials, preferably PVC, and that the shape and/or size of the cross-section of the flow channels is variable by changing the pressure in the flow channels, for example the pressure of the heat transfer medium.

Essential advantages of the covering materials according to the invention result from being made in one piece in endless tracks, from which tracks the pieces required for the covering and casing of roofs, walls and facades can be cut to length. In this manner, the covering material can fit directly on the surfaces to be covered, for example on a wall. The covering material, according to the invention, is flexibly elastically developed and does not itself have any static support functions.

By means of the flexibility of the covering material, proposed according to the invention, essential advantages result in comparison to the known rigid systems as they have been known up to now.

By combination of the covering material, according to the invention, with a heat pump, heat can be extracted from the atmosphere namely, at every desired temperature, if only the temperature of the heat transfer medium is kept lower than that of the environment. This is only possible with the known air-heat pump installations if the heat exchange surfaces are continuously de-iced. Since the heat exchange surfaces with the known energy absorbers consist of rigid material, these must be de-iced by thawing. This thawing requires energy, which must be fed to the collector and given off therefrom to the surroundings. The thereby occuring energy loss renders these known systems uneconomical, so that air-heat pump systems could thus far not be recommended for temperatures below the freezing point, because, for example, at a higher atmospheric humidity the de-icing cycles require more energy for thawing than could be extracted by heat extraction during the cooling cycle of the surrounding air.

In contrast, with the covering material according to the invention, the heat exchange surface is soft and flexible so that by a pressure change in the flow channels, for example, by means of a pressure change in the heat medium, a reduction (decrease of pressure) or an increase (rise of pressure) of the heat exchange surface can be brought about and therewith also a change of its outer shape. By a simple change of the pressure in the flow channels, an accumulation of ice and the like can thus be prevented in the most simple way. If, additionally the slope of the roof is chosen in such a way that the ice slides off, then the roof and therewith the entire heat exchanger surface can be kept continuously ice free. Energy from the system is thereby no longer given off to the surroundings, since the thus far required thawing cycles can be eliminated. The entire surface of the covering material, according to the invention, is constantly available for heat absorption from the environment. This is true for roof coverings as well as for perpendicularly mounted facade coverings.

Preferably, the covering material, according to the invention, is made of flexible plastic material. Plastic materials can be adapted to their intended use and requirements essentially more easily than metallic materials, both in their shape as well as in their properties. They can, for example, be standardized in such a way that they also exhibit, in addition to the high corrosion resistance, a very good low temperature retention, a good resistance to exposure and light stability as well as a good radiation absorption and, at the same time, fulfill all mechanical requirements. Additionally, plastic materials can be made into practically any desired shape through their easy workability and all aesthetic desires can then be taken into consideration. The simple processing of the finished work piece furthermore makes possible a very simple laying of the covering material according to the invention and, finally, all fire or structural regulations can be fulfilled by the correct choice of plastic material.

The dimensions of the tracks cut in lengths from the covering material, according to the invention, depends on the intended use. The covering material can be stored in rolls and laid in trackwise. The breadth of the track is determined by its ability to be handled. The individual pieces are simply brought to the desired size by unrolling and cutting off sections from track. The tracks can be laid in such a way that the heat transfer medium ascendingly flows through the flow channels in the covering material. One would choose a horizontal flow through if the drop in pressure in the flow channels is to be small.

An advantageous embodiment of the covering material, according to the invention, is that the flow channels are attached at a base plate or base foil, spaced from one another, and that the flow channels are formed by joining, especially by welding, a foil (which has a greater breadth than the base plate or base foil) along webs (provided between the flow channels) with the base plate or base foil. An advantage of this method is the use of the surface which is available from time to time, since essentially the entire surface has flow through channels. A large total cross-section of the flow channels is also attained herewith, so that each individual channel can have a relatively small cross-section.

In accordance with a further embodiment of the invention, adjacent flow channels are provided with a common wall partition. With this arrangement, the surface density of the flow channels is indeed smaller, however, the webs between the flow channels can serve as fasteners of the covering material, for example, by gluing or nailing on the base.

The cross-sectional form of the flow channels is not critical. Examples for cross-sectional forms are: semicircle, oval, semi-oval, hexagonal, semi-hexagonal, square, rectangular, trapezoidal, drop-shaped or triangular. All these cross-sectional forms of the flow channels can be made forthwith. Round or oval, or else semi-circular and semi-oval, cross-sectional forms are preferred for use in such cases where the flow channels are bound by thin-walled foils and expanded only when flown through with the heat transfer medium. Hexagonal and semi-hexagonal, as well as rectangular cross-sectional forms are advantageous then when one strives for a covering material reinforced by itself.

The contiguous tracks of the covering material according to the invention, can be laid pushed together in a butt joint and connected tightly to larger units by direct gluing or the like or instead by adhesive tapes. It is especially favourable within the scope of the invention if the track has flanges or tabs at its longitudinally lateral edges for connection with adjacent tracks for the purpose of making large surface units. These flanges of two adjoining tracks can then be flush or overlappingly laid and connected with one another and, additionally, facilitate the fastening of the covering material. By an overlapping laying of the flanges, it is advantageous if the flanges on one side of the track are attached higher than the flanges on the other side of the width.

As already indicated, it is advantageous if the covering material according to the invention, is made of synthetic or plastic material, preferably of PVC which is light-stable and/or fire-proof and/or unaffected by temperature changes. A further material, which is especially well suited, is EPDM (ethylenepropylene-dienepolymer) and CSM (sulfochlorinated polyethylene). Particularly with respect to the heat and noise insulation, it is advantageous if the covering material is covered with a layer on the one side, especially on the underside, with a layer of heat and/or noise insulated material as for example mineral wool, cellular plastic or the like.

If the size and/or the shape of the cross-section of the flow channels is not or not exclusively to be changed by variation of the pressure in the heat transfer medium, then an embodiment of the invention is realized having channels running parallel to the flow channels in which a liquid or gaseous medium is contained which can be increased with various high pressures.

With this type of a embodiment, it is possible for each flow channel to be allotted a channel containing the medium which can be increased with various high pressures or for each channel, containing the medium which can be increased, to be allotted several flow channels.

A further embodiment, according to the invention is that the flow channels have an essentially drop-shaped cross-sectional form and are formed from strip-like foil, the longitudinal borders of which are fastened by laying one above the other on a support foil. With this embodiment, the individual flow channels lie flat at the support foil and only then assume the substantially drop-shaped cross-sectional form when they are increased, for example, with pressure from the heat transfer medium.

The channels, which can be increased with pressure, can also, within the scope of the invention, be formed by separating a channel for the medium which can be applied with different high pressures, from each flow channel by a longitudinally extending partition made of a flexible material.

For joining the covering material according to the invention, or the tracks made thereof to a collection or distributor system for the heat transfer medium, it is proposed, within the scope of the invention, to insert tubular reinforcing elements, formed in accordance with the form of the inner cross-section of the flow channels, in the ends to be joined to the distributor or collector channel moldings of the flow channels.

The reinforcing elements could simply be put into the ends of the flow channels or even glued fast therein. If one lets them, for example, project halfways out of the flow channels of a track, then the flow channels of a further track of the covering material can be placed over the projecting other half of the reinforcing elements so that individual tracks of the covering material can be lengthened as desired.

Especially preferred for a one-sided adhesion, within the scope of the invention, is an embodiment which is characterized in that an extended sectional molding which forms the distributor or collector channel molding, preferably made of synthetic or plastic material, particularly hard-PVC, which fits tightly against the track in the area of the reinforcing element, which at least has one channel for the heat transfer medium, one sealing molding each, inserted in a groove and made preferably of a flexible material, being attached to the walls, respectively, adjacent to the open side of the sectional molding or channel thereof, whereby the surfaces of the sealing molds facing the width have a shape adjusted to the outer shape of the width.

If tracks are fastened on both sides to collector or distributor channels, then an embodiment is advantageous which is distinguished by providing a second channel open at one side in the sectional molding which is formed symmetrically to the first channel and relative to the longitudinally lateral plane of the sectional molding, and wherein two sealing molds are provided, preferably made of flexible material, and inserted in grooves in the walls adjacent to the open side of the second channel thereof, the surfaces of which which face the track adjusted to the outer shape of the width, and that the channels are connected with one another over their common wall intersecting openings.

With this embodiment, the sectional molding can be formed symmetrically with respect to its longitudinally central plane.

The ends of the tracks which are fastened to the sectional moldings can be held fast by gluing for example. It is, however, also possible, within the scope of the invention, to provide clamping devices for a tight fit of the sealing molds against the width or tracks inserted in the distributor or collector channel moldings.

BRIEF DESCRIPTION OF THE DRAWINGS

Further particulars and characteristics of the invention appear from the following description of preferred embodiments illustrated schematically in the drawings, of which.

DETAILED DESCRIPTION OF THE EMBODIMENTS

Figure 1:
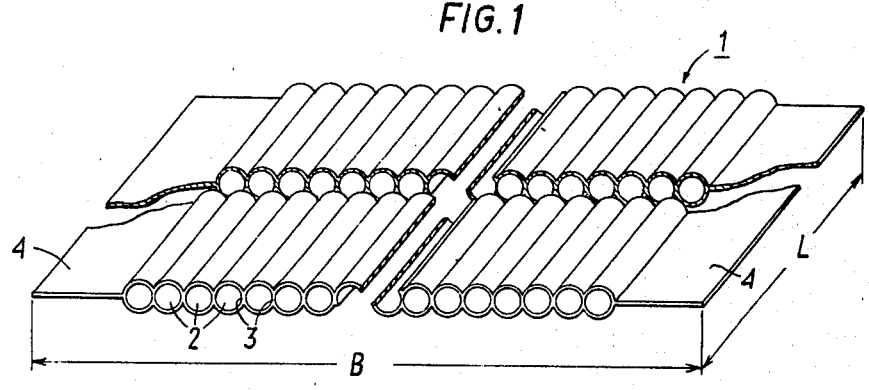
FIG. 1 is a perspective, broken-away view showing an embodiment of the covering material.

The covering material shown in FIG. 1 comprises a course or track 1 with flow channels 2, parallel to one another with a round cross-section, which are arranged without any space left therebetween tightly adjoining one another and which have common wall partitions. At both longitudinally lateral edges of the track 1, existing foil or laminated like, longitudinally running moldings 4 made of the same material as the covering are provided which serve as overlapping or joining connections of adjacent tracks 1. Any desired length L of the tracks 1, having breadth B, is prepared by separation of the desired track portion from endless finished tracks 1.

Figure 2:
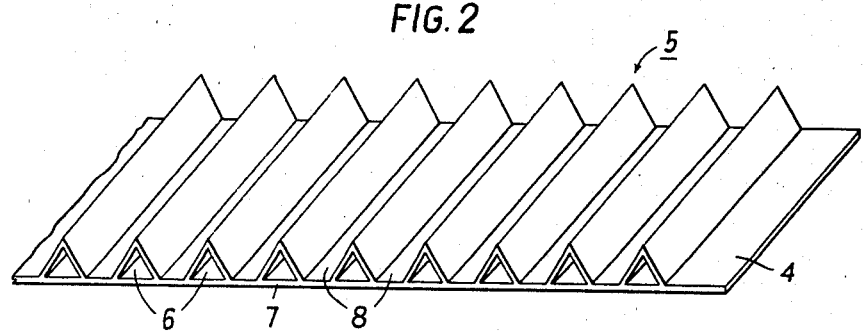
FIGS. 2 and 3 are similar views of two further embodiments of the covering material.

With the formation shown in FIG. 2, the flow channels 6 of the track 5 have a triangular cross-section, and the flow channels 6 are arranged, spaced from one another, on a base plate or base foil 7. The base plate or base foil 7 forms a part of the boundary wall of the flow channels 6. This formation can be produced by joining a foil in the area of webs 8, which are provided between the flow channels, for example, by gluing or welding, with the base plate or base foil 7 which serves as a support foil or plate. It is however also possible to make the track 5 in one piece with the lateral flanges 4, for example, by extrusion.

Figure 3:
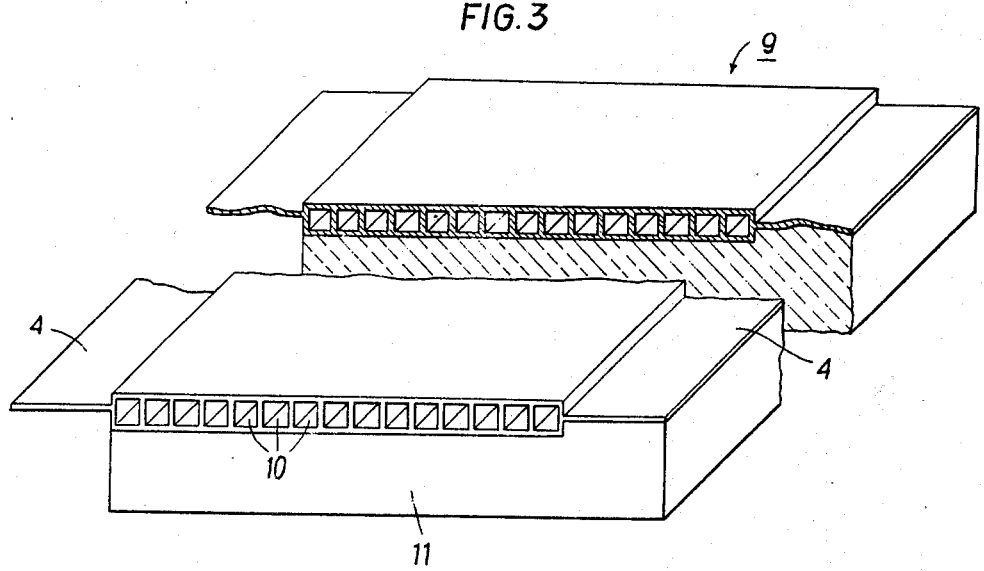

The track 9 shown in FIG. 3 has flow channels 10 directly in contact with one another with a square cross-section. The bottom of the track 9 is coated with a heat and/or noise insulating layer 11. The flanges 4 for connection of adjacent tracks are offset in elevation relative to one another, whereby, for example, the right flange 4 in comparison to the left flange 4 is off-set downwards by the thickness of the flange 4. In this way, a flat laying of adjoining tracks is assured. For the same reason, layer 11, made of insulating material, extends only on one side of the track 9 up to the area of flange 4.

The covering material according to the invention, can be laid on a base by gluing, for example, with bitumen. This is particularly true for the embodiments according to FIGS. 2 and 3, which have a flat lower side. But also the embodiment with a track corrugated at the bottom (FIG. 1) can be pasted on a base if the contact points suffice for a good adhesion, for which, for example, the adhesive layer can be formed thicker.

The tracks 1, 5 and 9 shown in the embodiments according to FIGS. 1 to 3 can be combined with one another as desired.

It is also possible to produce the embodiment of the track according to FIG. 1 with a flat base. Similarly, the embodiment according to FIG. 1 can be varied in such a way that the individual flow channels do not directly contact one another and have common wall partitions 3, but are separated from one another by webs similar to the method according to FIG. 2. The embodiments shown in FIGS. 1 and 2 increase the surface and decrease the reflection of irradiated light.

Figure 4:
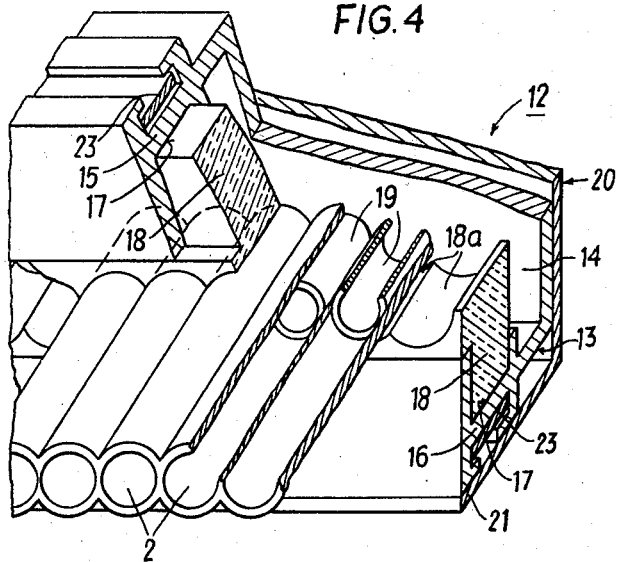
FIG. 4 is a partially broken off perspective view of a collector or distributor bar with fastened covering material.

The preferred embodiment shown in FIG. 4 of a distributor and/or collector channel molding 12 comprises a sectional molding 13, in which a channel 14 is provided through which the heat transfer medium to be distributed or collected flows. Channel 14 is open on one side. The walls 15 and 16 adjacent to the open side of channel 14 of the sectional molding 13 have grooves 17 opposite one another and in which, at times, there is inserted a sealing mold 18 which is connected tightly. The surfaces facing one another of the sealing mold 18 have recesses 18a corresponding to the outer shape of the track 1 of the covering material, so that the sealing molds 18 have a contour corresponding to the outer shape of the track. In the open ends of the flow channels 2, tubular reinforcing elements 19 of non-corrosive metal or synthetic material are inserted. The sealing molds 18, fitting appropriately tight at the ends of the track 1, are, if necessary, after gluing with the track 1 inserted into the grooves 17 of the sectional molding 13. Sectional molding 13 is made, preferably, of a hard non-corrosive material such as, for example, hard-PVC.

Figure 5:
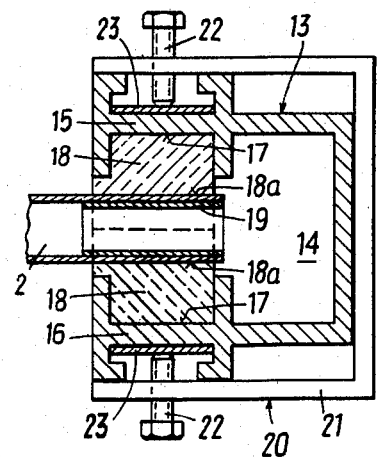
FIG. 5 is a cross-section through the arrangement of FIG. 4.

As shown in FIG. 5, a clamp device 20 can be attached to the sectional molding 13. Clamp device 20 is made essentially of a U-sectional strip 21 in which screws 22 are screwed in. Screws 22 push steel bands 23, provided in the sectional molding 13, against the walls 15 and 16 of the sectional molding 13 and press the sealing molds 18 tightly against the track 1. In place of hexagonal screws 22, one can also use socket head cap screws. Screws 22 are preferably arranged on both sides, as shown in FIG. 5, so that a sliding off of the clamp device is certainly prevented.

Figure 6:
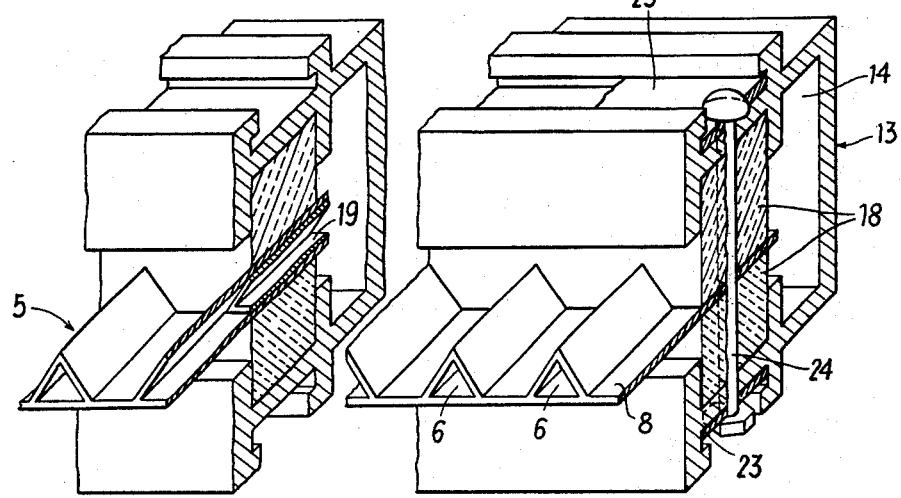
FIG. 6 shows a modified embodiment of the collector or distributor bar in perspective view, partially broken off.

In the embodiment according to FIG. 6, in which a width 5 according to FIG. 2 is clamped in a distributor or collector channel rail, the clamping operation is attained by screws 24 which pass through the sectional moldings 13 in the area of the sealing molds 18 and penetrate the width 5 in the area of the channel-free web 8 of the track 5.

The heat transfer medium flows through channel 14 in a distributor channel molding 12 into the flow channels and then flows off through a collector channel molding 12. Not only the distributor channel molding but also the collector channel molding are connected with the rest of the circulation system of the heat medium via connecting pieces not shown, for example, T-pieces. Simple sealing plates outwardly close off the ends, which are not required for connections, of the channels 14 in the distributor and collector channel moldings.

Figure 7:
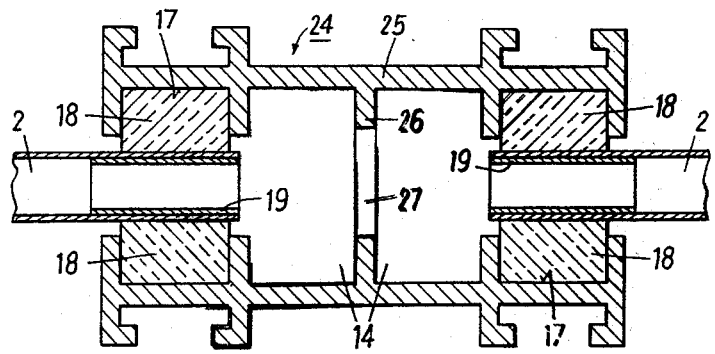
FIG. 7 is a collector or distributor bar for the fastening of two widths of the covering material.

Distributor channel molding 24 in the embodiment shown in FIG. 7 is installed for connection on both sides of the tracks. The sectional molding 25 of the distributor channel molding 24 corresponds essentially to two sectional moldings 13, whereby however the rear wall of channels 14 are formed as a common wall 26. In wall 26, openings 27 are provided in order to enable as much as possible an unimpeded flow of the heat transfer medium from the flow channels 2 of one track 1 into those of the other track 1 of the covering material.

Figure 8:
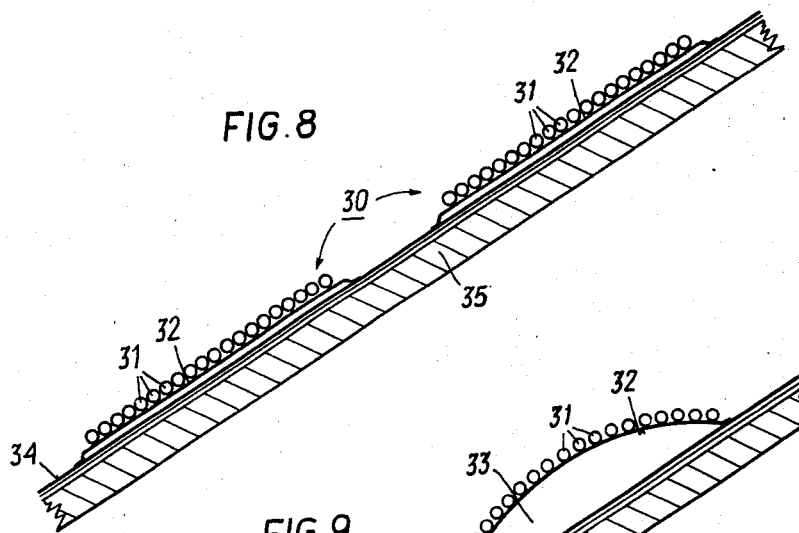
FIGS. 8 and 9 are broken away views of another embodiment of the covering material, and FIG. 10 in section is a fifth embodiment of the covering material.
Figure 9:
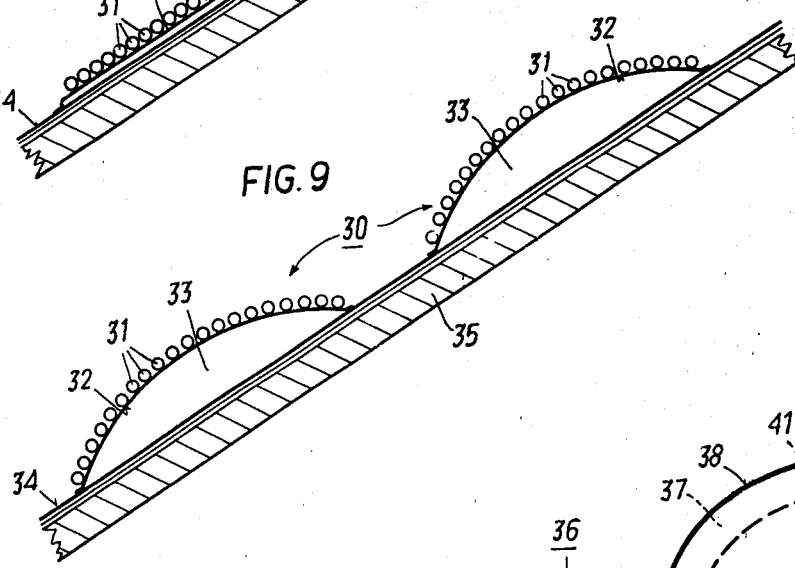

With the embodiment shown in FIGS. 8 and 9 of a track 30 of the covering material, the flow channels 31 are arranged on a base foil 32. The base foil 32 is fastened on a support foil 34 forming of a further channel 33, which in turn can be joined, for example, by gluing, with a base 35. With a pressure increase of a liquid or gaseous medium contained in the channels 33, the channels 33 are expanded and the outer shape of the track 30 having the flow channels 31 is altered. This pressure increase or even reduction of the pressure of the medium contained in the channels 33 can occur instead of or simultaneously with a pressure change of the heat transfer medium in the flow channels 31. The embodiment shown in FIGS. 8 and 9 of the covering material according to the invention enables an essentially reinforced change of shape of the outer surface of the track and therewith permits a further improved throwing off of ice or snow accumulations, particularly also with flatter roofs.

Figure 10:
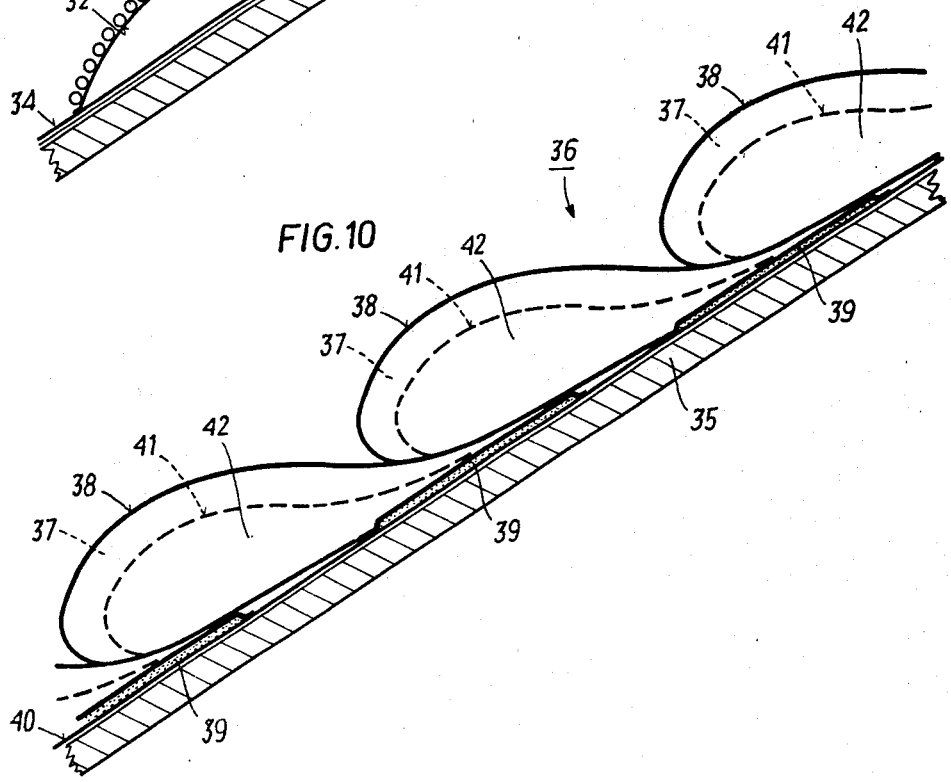

In FIG. 10, a track 36 formed as a pleated absorber is portrayed. The flow channels 37 of the track 36 are here bound by longitudinally folded foil strips 38 which are fastened to a support foil 40 in the area 39. The support foil 40 is again to be fastened to a base 35. Within the flow channels 37, limited by the foil strips 38, a further partition 41 of flexible material is provided which bounds a channel 42. In the flow channel 37, the heat transfer medium flows, whereas the channel 42—similar to channel 33 of FIGS. 8 and 9—can be increased independently hereof with a pressure medium.

With the embodiment according to FIG. 10, the flow channels 37 are formed as folds and have an essentially water-drop shaped cross-sectional form. The foil strips 38 are linearly fastened, in an extreme case, at their free edges on the support foil 40 or to another base. If several of such drop-shaped flow channels 37, which are made of a material with the necessary elasticity and flexibility, are fastened on the support foil 40 partially overlapping one another and attached horizontally on a roof, then a visual impression similar to a traditional roof results. As soon as the heat transfer medium flows through the flow channels 37, then these will, depending on the pressure of the heat transfer medium, more or less open widely and the outer shape as well as the cross-sectional shape of the channels 37 are changed. By overlapping the flow channels 37, the entire available surface is used for the heat absorption of heat exchange.

The fastening of the foil strips 38 forming the folds can take place, for example, by stitching, gluing or welding. It is however also possible to make the foil strips 38, which bound the flow channels 37, with the support foil 40 in one piece. It is further conceivable to mount the foil strips 38 directly on a roof, whereby the roofing coat, for example, a roofing paper or the like takes over the function of the support foil 40. The fastening can—similar to the fastening on the support foil 40—take place by stitching, gluing, welding, nailing or the like.

The heat transfer medium can be introduced in various ways, whereby the introduction can also take place via tube pieces inserted in the ends of the flow channels 37. A preferred possibility is the use of distributor or collector channel moldings for the heat transfer medium, as they are shown in FIGS. 4 to 7.

In case the flow channels 37, which are enclosed by the foil strips 38, are subdivided by a partition 41, the heat transfer medium will flow in one chamber half, preferably in the outward flow channels 37, whereas a counter-pressure will be built up in the channels 42 by a liquid or gaseous pressure medium, which pushes the partition 41 outwards. The free cross-section of the flow channels 37 can be adjusted in this manner to the desired value. In this way, the flow through quantity of the heat transfer medium can also be regulated in a simple manner. If a high flow through quantity is desired, then the counter pressure on the flow channels 37 is reduced by a simple pressure reduction of the medium contained in the channel 42, whereby the partition 41 gives way and more heat transfer medium can flow through the fluted absorber.

The foil strip 38 of the flow channels 37 can be made of a transparent material. If the outer flow channel 37 is increased with the pressure medium, for example, with air and the heat transfer medium is now conducted through the channels 42, then the track 36 is available as absolute solar collector.

The possibility previously described for the track 36 according to FIG. 10 for the change of the cross-section of the flow channels 37 is also possible by the embodiments shown in FIGS. 1 to 3. An enlargement or a reduction of the cross-sectional surface of the flow channel can also be effected with these embodiments by a variation of the pressure in the heat transfer medium. The possibility therefore exists to accordingly adapt the quantity of heat transfer medium contained in the covering material, according to the invention, to the respective operating conditions, for example, the external temperature and/or the intensity of the solar absorption.

As already indicated, the covering material according to the invention can be used by coupling with a heat pump for obtaining heat from the environment. By a corresponding control, it is possible to maintain the temperature of the heat transfer medium below the ambient temperature, whereby an emission of once absorbed heat to the environment becomes physically impossible.

The channels 33 do not have to be parallel to the flow channels 31. They can extend at any desired angle, for example, perpendicular to these.

The area 39, where the foil strips 38 are fastened, can embrace two weld seams attached at a distance from one another, between which the covering material can be fastened, for example, by nailing to the roof or facade.

All elastomer or plastomer materials, as well as caoutchouc, are suitable as material for the covering material.

The covering material according to the invention can also be finished from reinforced foil, especially web or fabric reinforced foil. This is particularly true of the embodiments according to FIG. 10 and the base or support foils of the embodiments shown in FIGS. 2, 8, 9 and 10 and, with the latter, also for the partition 41. The reinforcement can be made of polyamide, polyester and where a particularly good heat conduction is desired, of metal.

For specific cases, for example, particularly if it depends on a high UV-stability, the outer side of the covering material according to the invention can at least be made of metallized, for example, black metallized, synthetic foil.

The terms "width(s)" or "track(s)" used herein is also referred to as web(s) in the claims.

I claim:

1. A covering for walls, facades and roofs comprising webs which for the absorption of radiant and environmental heat having flow channels running parallel to each other for a heat transfer medium which flows through the channels and are made of flexible synthetic material, the improvement wherein additional channels (33, 42) are formed in the webs running approximately parallel to said flow channels (e.g. 31, 37), a flow through medium being contained in the additional channels, the external shape of the webs and the size of the cross section of the additional channels are variable by means of change of the pressure of the medium in said additional channels, an expandable base foil defining an outer peripheral wall of each of said additional channels, respectively, a plurality of said flow channels being attached to each of said base foil of said additional channels, respectively, and a support foil being connected to ends of said base foils, respectively, said support foil forms a bottom peripheral wall of all of said additional channels.

2. A covering for walls, facades and roofs comprising webs which for the absorption of radiant and environmental heat having flow channels running parallel to each other for a heat transfer medium which flows through the channels and are made of flexible synthetic material, the improvement wherein the webs are made by cutting to length endless webs so as to define flow channels with open ends, and that said flow channels by change of the pressure of the heat transfer medium in the flow channels, are variable in the external form of said webs and the size of the cross section of said flow channels are variable for removing ice, a support, and foil strips forming a drop-shaped outer peripheral wall of said flow channels, respectively, and each of said foil strips having longitudinal edges connected to said support partially overlapping said edges of an adjacent of said foil strips.

3. The covering according to claim 2, further comprising a flexible and elastic partition disposed in each of said flow channels divides each of said flow channels into one additional channel thereinside, respectively, each said additional channels being changeable in cross-section inside said flow channels by a pressure change of a heat transfer medium flowing therethrough.

4. A covering for walls, facades and roofs comprising webs which for the absorption of radiant and environmental heat having flow channels running parallel to each other for a heat transfer medium which flows through the channels and are made of flexible synthetic material, the improvement wherein additional channels (33, 42) are formed in the webs running approximately parallel to said flow channels (e.g. 33, 37), a flow through medium being contained in the additional channels, the external shape of the webs and the size of the cross section of the additional channels are variable by means of change of the pressure of the medium in said additional channels, a support, and foil strips forming a drop-shaped outer peripheral wall of said flow channels, respectively, and each of said foil strips having longitudinal edges connected to said support partially overlapping said edges of an adjacent of said foil strips.

5. The covering according to claim 4, further comprising a flexible and elastic partition disposed in each of said flow channels divides each of said flow channels into one of said additional channels.

6. The covering according to claims 2, 3, 4, or 5, wherein said support is a support foil.

7. The covering according to claim 6, further comprising a base fastened at a bottom of said support foil.

* * * * *